Figure 1:
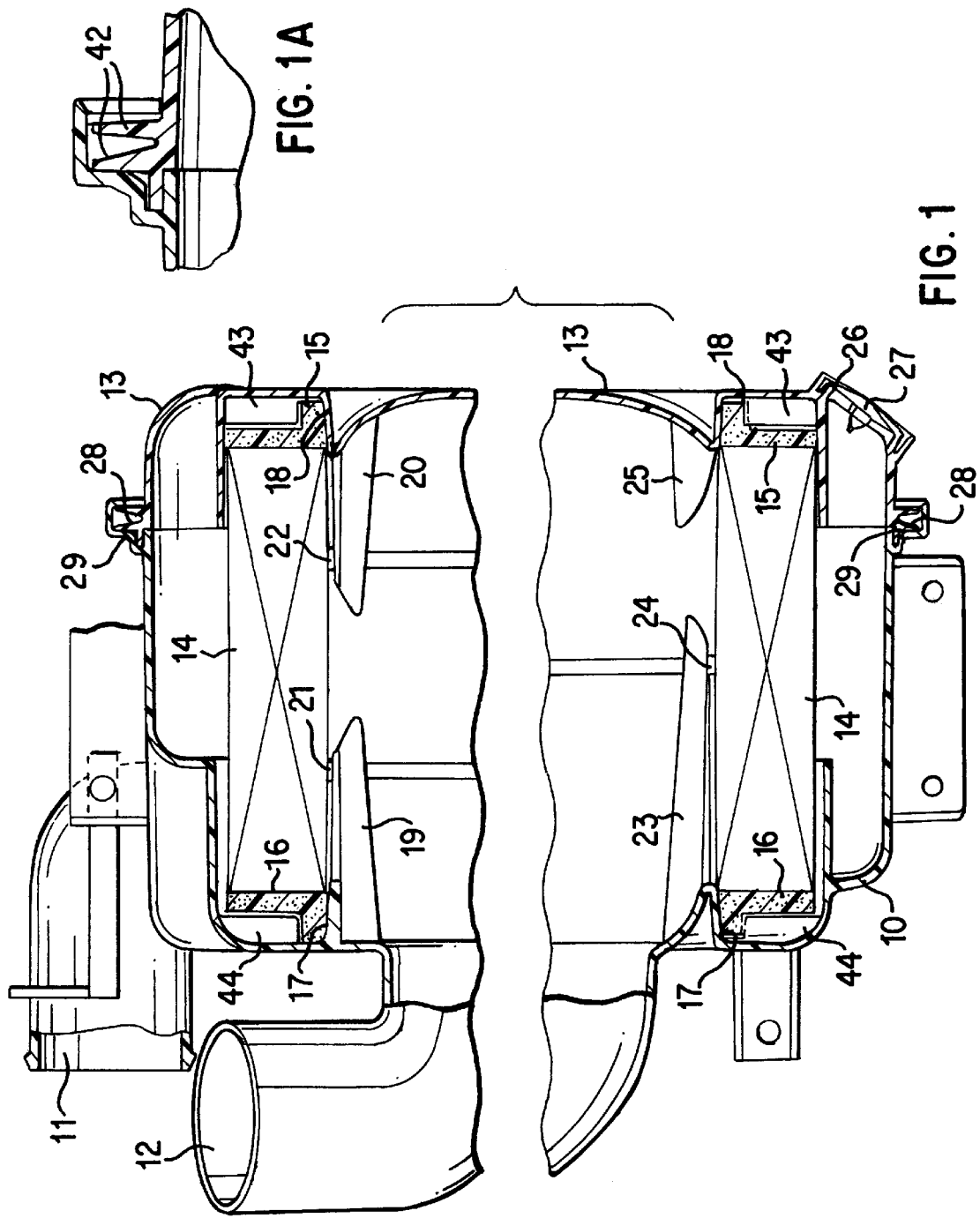

United States Patent [19]
Ernst et al.

[11] Patent Number: 5,951,729
[45] Date of Patent: Sep. 14, 1999

[54] FILTER FOR THE AIR INTAKE OF AN INTERNAL COMBUSTION ENGINE

[75] Inventors: Volker Ernst, Sachsenheim; Arthur Klotz, Remseck; Rudolf Leipelt, Marbach; Bruno Sommer, Ludwigsburg, all of Germany

[73] Assignee: Filterwerk Mann & Hummel GmbH, Ludwigsburg, Germany

[21] Appl. No.: 08/973,946

[22] PCT Filed: Mar. 8, 1996

[86] PCT No.: PCT/EP96/01000

§ 371 Date: Jun. 15, 1998

§ 102(e) Date: Jun. 15, 1998

[87] PCT Pub. No.: WO96/38217

PCT Pub. Date: Dec. 5, 1996

[30] Foreign Application Priority Data

Jun. 1, 1995 [DE] Germany .......................... 195 20 156

[51] Int. Cl.⁶ .................................................. B01D 39/08
[52] U.S. Cl. ................................ 55/498; 55/499; 55/500; 55/501; 55/502

[58] Field of Search ............................. 55/495, 497, 498, 55/499, 501, 502, 385.3, 511, 500, DIG. 31

[56] References Cited

U.S. PATENT DOCUMENTS 4,929,263  5/1990  Kasugai ..................................... 55/497
5,391,212  2/1995  Ernst et al. .............................. 55/385.3

*Primary Examiner*—Jay H. Woo
*Assistant Examiner*—Robert A. Hopkins
*Attorney, Agent, or Firm*—Evenson, McKeown, Edwards & Lenahan, P.L. L.C.

[57] ABSTRACT

An air filter for an for an air intake of an internal combustion engine. The filter includes a housing with a raw air inlet and a clean air outlet and an annular filter element having a pleated filter medium disposed therein. At least one buttressing element is provided to support the filter medium at the clean air side. The buttressing element has a knife-edge buttress disposed on the housing that extends to a position of maximum flexure of the filter element. The knife-edge buttress is further provided with a support shoe disposed thereon such that the shoe supports the filter element.

6 Claims, 2 Drawing Sheets

FILTER FOR THE AIR INTAKE OF AN INTERNAL COMBUSTION ENGINE

The invention relates to a filter, especially an air filter for the air intake of an internal combustion engine.

DE-PS 5 14 778 discloses a filter insert in which the filter element consists of a pleated filter element. Supporting tubes are disposed on the end disks of the filter element. These supporting tubes consist especially of plastic and are provided with strengthening rings. A disadvantage of this filter insert is that the filter element must be replaced only together with the supporting tubes.

It is also known to dispose a filter element on a perforated sheet metal supporting tube. This sheet metal tube, however, is necessary as an additional element in a filter housing and thus signifies elevated production equipment costs and higher manufacturing costs.

The invention is addressed to the problem of creating a filter which can be manufactured inexpensively, involves low disposal costs, and is pressure-stable.

This problem is solved, setting out from the preamble of the principal claim, by the distinctive features thereof. An important advantage of the invention is that additional elements, supporting tubes or the like are not necessary, since the knife-blade buttresses are part of the housing. Thus there is no need to dispose of such additional parts.

In an advantageous embodiment of the invention, the knife-blade buttresses extend to the point of greatest flexure of the filter medium, that is, approximately into the center part of the filter medium. Both this area is thus supported as well as outer areas over which the knife-blade buttresses extend.

According to an embodiment, additional knife-blade buttress or fixation means for the filter medium is provided on the cover which closes the housing. This cover thus serves on the one hand for the supplemental positioning of the filter medium, and on the other hand for the stabilization thereof.

In an additional embodiment it is proposed to provide the knife-blade buttress with supporting shoes. These shoes enable a greater area of the filter medium to be supported. At the same time the shoes avoid point stresses in the supported area.

According to a further embodiment of the invention, the filter medium can be provided with glue beads. These glue beads improve the internal stability of the filter medium. Moreover they serve as points or surfaces of contact with the knife-blade buttress.

In an advantageous manner the filter cover can be fastened on the housing without additional sealing means. For this purpose sealing lips are formed on the cover which is made of a thermoplastic or on the housing which is also made of thermoplastic. These sealing lips can additionally be configured as labyrinth seals.

Figure 2:
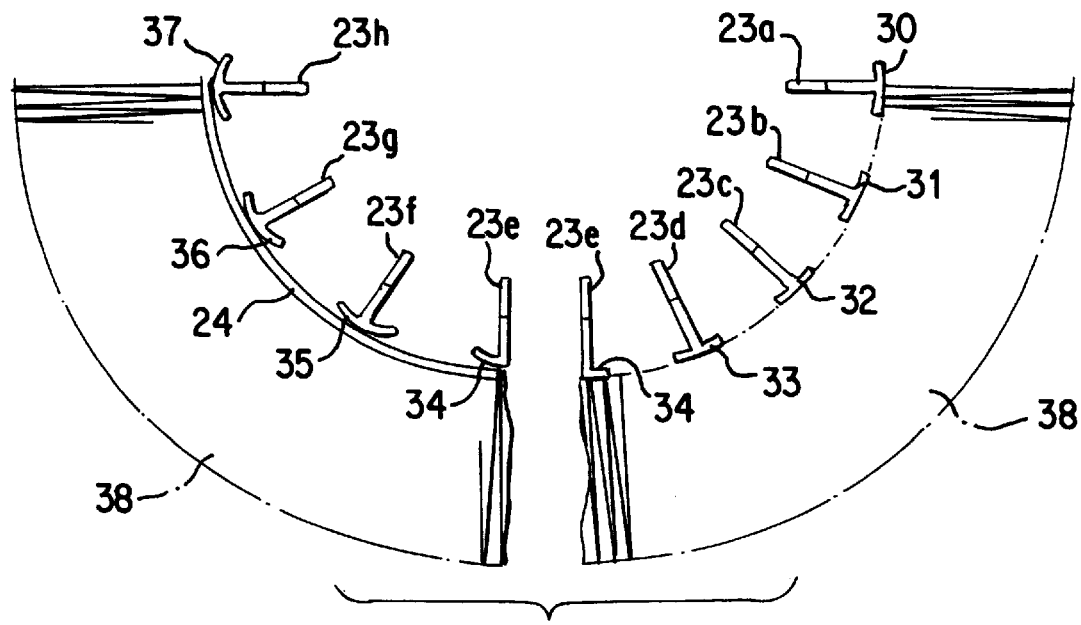
Figure 3:
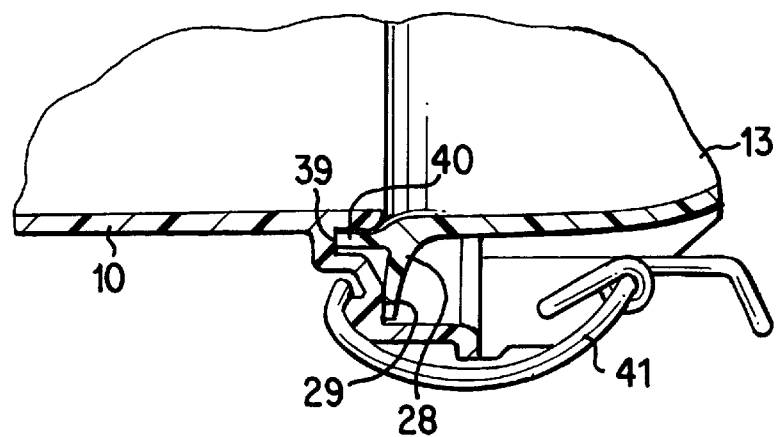

These and other features of preferred embodiments of the invention will appear not only in the claims but also in the description and the drawings, while the individual features can be realized individually or plurally in the embodiment of the invention and in other fields, and may represent independently patentable embodiments for which protection is hereby claimed. Embodiments of the invention are represented in the drawings and will be further explained herein. The drawings show:

FIG. 1 two half-sectional representations of a filter,

FIG. 1A an enlarged view of an embodiment of the sealing structure,

FIG. 2 a section of a side view,

FIG. 3 a variant of a closure.

The filter in FIG. 1 consists of a filter housing 10 which has a raw air inlet 11, a clean air outlet 12 and a cover 13. The housing and the cover are advantageously made of plastic by injection molding. In the housing is a filter element 14 which is made of pleated filter paper (filter medium). This filter element has sealing disks 15, 16. These consist for example of soft polyurethane foam. The sealing disks serve both for sealing the ends, and for sealing the filter element 14 at radial sealing surfaces 17, 18 and ribs 43, 44 of the housing and cover, respectively. In the upper half section, both the housing 10 and the cover 13 are provided each with knife-blade buttresses 19, 20. Each of the knife blades reaches to about one-third the length of the filter element 14 into its inner hollow. The filter element 14 is provided with so-called glue beads 21, 22. Each knife blade is in contact with these glue beads. In the lower half section the filter housing is equipped with knife-blade buttresses 23. These buttresses extend all the way to the axial center of the filter element 14. There too the filter element has a glue bead 24 with which the knife-blade buttress 23 is in contact. The cover 13 is provided with only one fixating means 25. This has the purpose of positioning the filter element 14 when the cover is closed. The cover 13 is provided on the bottom with an opening 26. This opening 26 is closed with a valve with deflector 27 and serves for removing the coarse dirt. To create a seal between the cover 13 and the filter housing 10 a lipped gasket 28 is provided on the contact surface of the cover. This lipped gasket is in contact with bias with the sealing surface 29 of the housing and provides for a reliable sealing of the raw air area of the air filter. The sealing lip gasket 28 may be formed as a labyrinth seal, as shown in FIG. 1A.

FIG. 2 shows a detail of a side view the knife-blade buttresses 23a to 23g. These knife-blade buttresses are provided with shoes 30 to 37, and the shoes, as represented on the right side, can be directly in contact with the pleated filter medium 38 as well as with the glue bead 24 applied to the filter medium 38.

FIG. 3 shows the variant closure. The closure serves to affix the cover 13 on the housing 10. Here again the cover 13 is provided with a lip seal 28 which lies upon the sealing surface 29 of the filter housing. The radial fixation of the cover on the filter housing is performed with an annular groove 39 on the housing 10. An appendage 40 of the cover extends into this annular groove. This appendage 40 lies on the bottom of the annular groove and thus defines the axial end abutment of the cover 13. Thus any overstretching of the lip gasket is prevented. A wire loop hasp 41 for example may be selected as the closure. Of course, other variants with as snap closures, catch closures or the like are possible.

What is claimed is:

1. An air filter comprising a housing with a raw air inlet and a clean air outlet, an annular filter element having a pleated filter medium disposed in the housing, at least one buttressing element being provided which supports the filter medium at the clean air side, wherein the buttressing element comprises a knife-edge buttress disposed on the housing that extends to a position of maximum flexure of the filter element, and wherein the knife-edge buttress further comprises a support shoe disposed thereon such that the shoe supports the filter element.

2. A filter according to claim 1, wherein the housing is closable by a cover, the cover having additional knife-edge buttresses or fixation means for the filter element.

3. A filter according to claim 1, wherein the filter element has, in the area of maximum flexure, glue beads in contact with the knife-blade buttresses.

4. A filter according to claim 1, wherein the cover is fastened sealingly to the housing by a sealing element comprising a sealing lip integrated into the cover and is biased against the housing when the cover is in a closed position, the sealing lip being configured such that the bias can easily be limited, independently of dimensional tolerances and deformations.

5. A filter according to claim 4, wherein the sealing lip is configured as a labyrinth seal.

6. A filter according to claim 1, wherein the filter element is axially held by ribs which together with sealing surfaces form a substantially wedge-shaped chamber.

\* \* \* \* \*